United States Patent [19]

Kamei

[11] Patent Number: 4,641,542

[45] Date of Patent: Feb. 10, 1987

[54] SWING MECHANISM FOR WINDER NOZZLES

[75] Inventor: Masato Kamei, Tokyo, Japan

[73] Assignee: Kamei Machine Co., Ltd., Tokyo, Japan

[21] Appl. No.: 744,557

[22] PCT Filed: Jul. 11, 1984

[86] PCT No.: PCT/JP84/00359

§ 371 Date: May 31, 1985

§ 102(e) Date: May 31, 1985

[30] Foreign Application Priority Data

Apr. 9, 1984 [JP] Japan .................................. 59-69068

[51] Int. Cl.[4] ............................................ F16H 37/16
[52] U.S. Cl. .................................... 74/23; 74/22 R; 74/49; 242/1.1 R
[58] Field of Search ................... 74/22 R, 23, 49; 242/1.1 R, 1.1 E, 1.1 A

[56] References Cited

U.S. PATENT DOCUMENTS

| 239,081 | 3/1881 | Bentzon | 74/23 |
| 1,172,264 | 2/1916 | Dorau | 74/23 |
| 1,273,336 | 7/1918 | Dorau | 74/23 |
| 1,480,495 | 1/1924 | Bessler | 74/23 |
| 2,482,784 | 9/1949 | Lohutko | 74/22 |
| 2,697,946 | 12/1954 | Hardesty | 74/22 |
| 3,787,000 | 1/1974 | Farnsworth et al. | 242/1.1 E |
| 4,169,681 | 10/1979 | Kato | 74/22 R |

Primary Examiner—Lawrence J. Staar
Assistant Examiner—Martin G. Belisario
Attorney, Agent, or Firm—Sachs & Sachs

[57] ABSTRACT

A crank 6 is connected to a prime shaft 8, a differential gear unit is coupled to the prime shaft 8, nozzles 13 and 14 for passage of wires W1 and W2 for winding are mounted to a tube 12, a rotation stopper 15 is coupled to one of facing gears of the differential gear unit, a guide rail 16 is arranged for parallel movement with the tube 12, and rotation of the crank 6 provides the nozzles 13 and 14 with swing angle and lateral displacement. The nozzles 13 and 14 perform winding while rotating around field cores 2 and 3 corresponding to the rotation angle $\theta$ of the crank 6.

1 Claim, 4 Drawing Figures

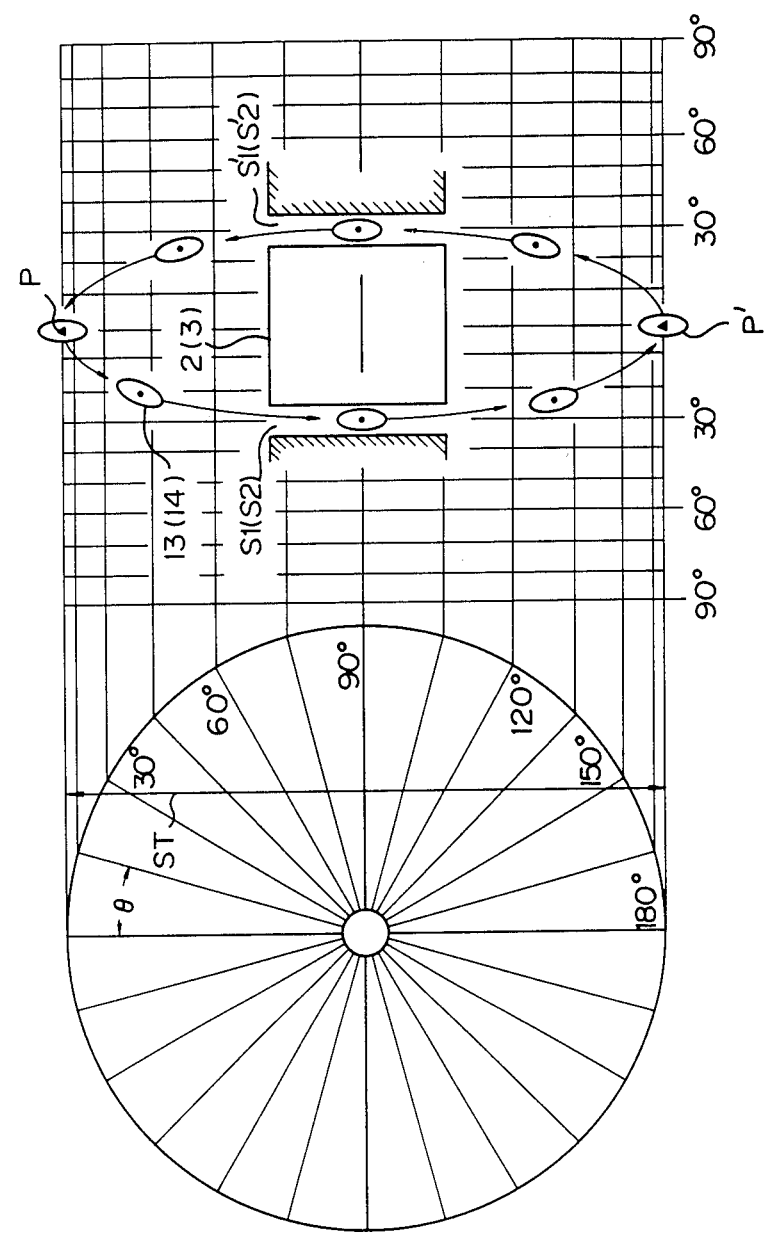

SWING MECHANISM FOR WINDER NOZZLES

TECHNICAL FIELD

The present invention provide means for winding a wire on a field core by rotating a winder nozzle along the periphery of the field core by means of a differential gear unit on an automatic winder for a bipolar stator.

TECHNICAL BACKGROUND

In case of the conventional swing mechanism for direct winding on a field core of a stator, use of a cam unit caused cam fatigue at high speed operation and difficulty in adjustment.

In accordance with the present invention, a nozzle is swung to rotate along the periphery of a field core by means of a differential gear unit, for example a combination of bevel gears, thereby minimizing mechanical fatigue and enabling easy adjustment.

DISCLOSURE OF THE INVENTION

In accordance with the present invention, a universal joint is attached to a prime shaft and a crank is coupled to the universal joint for rotation of the prime shaft. A bevel gear is mounted to the prime shaft and another bevel is placed in meshing engagement with the above-described bevel gear. A shaft having a nozzle at its one end is arranged through the bevel gears. A rotation stopper having a slider sliding along a guide rail is attached sideways to one of the bevel gears. The bevel gears are driven for rotation by rotation of the crank in order to provide the nozzle with swing angles. By concurrently providing the shaft with up and down movement, the nozzle is driven for an oval movement for winding on a field core. As a consequence, even high speed movement of the crank assures uniform up and down movement and rotation of the nozzle. Change in position of the crank enables easy adjustment in stroke of the shaft.

BRIEF EXPLANATION OF THE DRAWINGS

FIG. 4 shows the track of the nozzle movement corresponding rotation angle of the crank.

THE BEST EMBODIMENT FOR PRACTICE OF THE INVENTION 1 indicates a stator and field cores 2 and 3 are formed on the stator 1. 4 indicates a motor used as a drive source and a bent crank 6 is connected on the one hand to the motor 4 via a belt B and on the other hand to a later described prime shaft 8. As shown in FIG. 1, a prime shaft 8 is coupled to the crank 6 via a spherical bush 7, i.e. one example of a universal joint, and a bevel gear 9 is also secured to the prime shaft 8. Facing bevel gears 10 and 11 are arranged in meshing engagement with the bevel gear 9 and a tube 12 is disposed through the facing bevel gears 10 and 11 for passage of wires W1 and W2 used for winding. Nozzles 13 and 14 are coupled to the top end of the tube 12 through which the wires W1 and W2 pass for winding on the field cores 2 and 3. 15 indicates a rotation stopper. One end of the rotation stopper 15 is coupled to the bottom of the facing bevel gear 11 and the other end thereof is coupled in one body to a slider 17 on a guide rail 16 arranged side-by-side with the tube 12.

Figure 1:
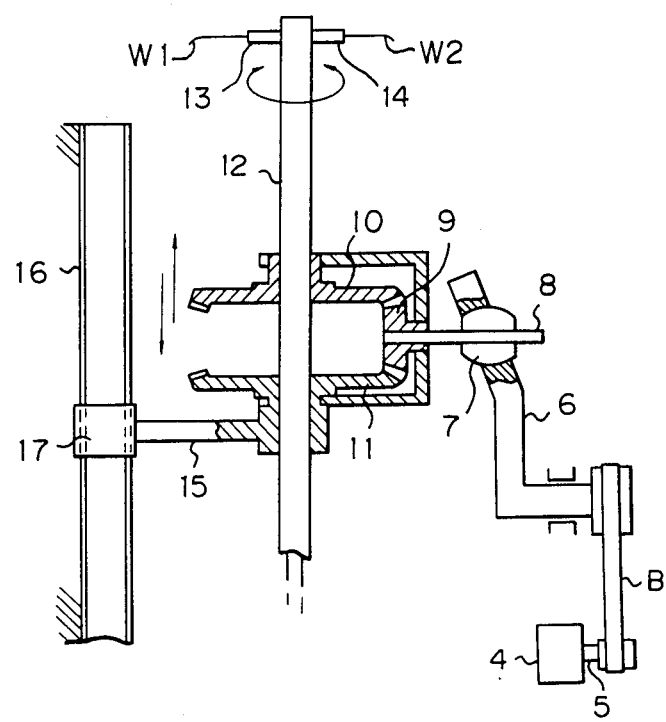
FIG. 1 is a partly sectional explanatory view of one embodiment of the present invention.
Figure 2:
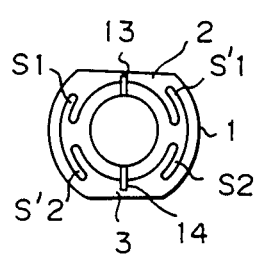
FIG. 2 is a plan view of a bipolar stator.
Figure 3:
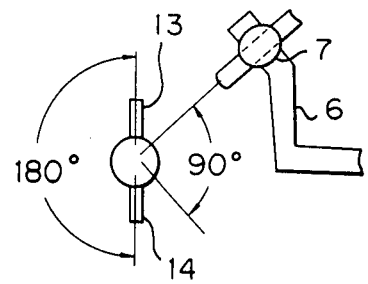
FIG. 3 shows positions of the nozzle corresponding to rotation of the crank.

As the motor 4 is activated, the crank 6 is driven for rotation via the belt B in order to rotate the prime shaft 8 via the spherical bush 7. Further, while rotating the facing bevel gear 10 with the tube 12, the crank 6 rotates the nozzle 13(14) around the field core 2(3) as shown in FIG. 4. Continued rotation of the crank 6 causes 1 stroke of the tube 12 in order to issue the wires W1 and W2 through the nozzle 13(14). Different wires W1 and W2 pass through different slot S1(S2) in order to be wound on the field core 2(3). Concurrently, the slider 17 secured to the rotation stopper 15 moves along the guide rail 16 arranged side-by-side with the tube 12. As a result, while the tube 12 moves a distance PP' between the maximum stroke ST, the nozzle 13(14) is sequentially driven for movement as shown with arrows. That is, as the crank 6 rotates over 180 degrees, the nozzle 13(14) moves upwards as shown in the right half in FIG. 4 in order to return to the point P. Thus, the nozzle 13(14) moves up and down through the slots S1–S1' (S2–S2') of the field core 2(3) while repeating rotation. In this way, the nozzle travels around the field core 2(3) for winding purposes. That is, the nozzle 13(14) rotates corresponding to the rotation angle $\theta$ of the crank and moves so that the wire W1(W2) should be wound on the field core 2(3). The nozzle 13(14) is at the maximum swing angle and displacement when the rotation angle $\theta$ of the crank 6 is equal to 90 degrees as shown in FIG. 3. The rotation angle of the crank, the swing angle and displacement of the nozzle and the stroke ST of the tube 12 change as summarized in the following table.

| Rotation angle $\theta$ of the crank 6 | Nozzle 13, 14 swing angle | Lateral displacement | Change in stroke ST of the tube 12 |
|---|---|---|---|
| 0° | 0 | 0 | Max |
| 98 | Max. | Max. | 0 |

In the case of the present invention, use of a differential gear unit such as bevel gears enables change in winding speed by change in gear ratio.

I claim:

1. A swing mechanism for winder nozzles on a stator winder having bipolar field cores comprising
   a bevel gear secured to a prime shaft coupled to a crank by means of a universal joint,
   facing bevel gears arranged in meshing engagement with said secured bevel gear,
   a tube coupled to one of said facing bevel gears and provided with nozzles,
   a rotation stopper coupled sideways to the other of said facing bevel gears and having a slider, and
   a guide rail for said slider arranged side-by-side with said tube.

* * * * *